(12) United States Patent
Kawazu et al.

(10) Patent No.: US 12,287,889 B2
(45) Date of Patent: Apr. 29, 2025

(54) INFORMATION PROCESSING APPARATUS, CONTROL METHOD OF INFORMATION PROCESSING APPARATUS, AND STORAGE MEDIUM

(71) Applicant: Canon Kabushiki Kaisha, Tokyo (JP)

(72) Inventors: Ayuta Kawazu, Kanagawa (JP); Nobuhiro Tagashira, Chiba (JP); Takami Eguchi, Tokyo (JP); Yuki Minetomo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 241 days.

(21) Appl. No.: 18/060,671

(22) Filed: Dec. 1, 2022

(65) Prior Publication Data
US 2023/0195910 A1    Jun. 22, 2023

(30) Foreign Application Priority Data
Dec. 20, 2021    (JP) ................ 2021-206260

(51) Int. Cl.
*G06F 21/60*    (2013.01)
*H04L 9/40*    (2022.01)

(52) U.S. Cl.
CPC ............ *G06F 21/604* (2013.01); *H04L 63/20* (2013.01)

(58) Field of Classification Search
CPC ....... G06F 21/604; G06F 21/608; H04L 63/20
See application file for complete search history.

(56) References Cited

U.S. PATENT DOCUMENTS

| 11,228,692 B2 | 1/2022 | Nakazawa |
| 2019/0207981 A1* | 7/2019 | Sweeney ............... H04L 41/145 |
| 2020/0396260 A1* | 12/2020 | Nahas ..................... G06F 18/22 |
| 2021/0019414 A1* | 1/2021 | Vijayvargiya .......... G06F 21/57 |

FOREIGN PATENT DOCUMENTS

JP    2016062558 A    4/2016

OTHER PUBLICATIONS

Co-pending U.S. Appl. No. 18/153,405, filed Jan. 12, 2023.

* cited by examiner

*Primary Examiner* — Mohammad W Reza
(74) *Attorney, Agent, or Firm* — Venable LLP

(57) ABSTRACT

An information processing apparatus, comprising a setting unit that executes a security setting on the information processing apparatus based on an installation environment of the information processing apparatus, wherein the setting unit executes the security setting again at a specific timing.

13 Claims, 13 Drawing Sheets

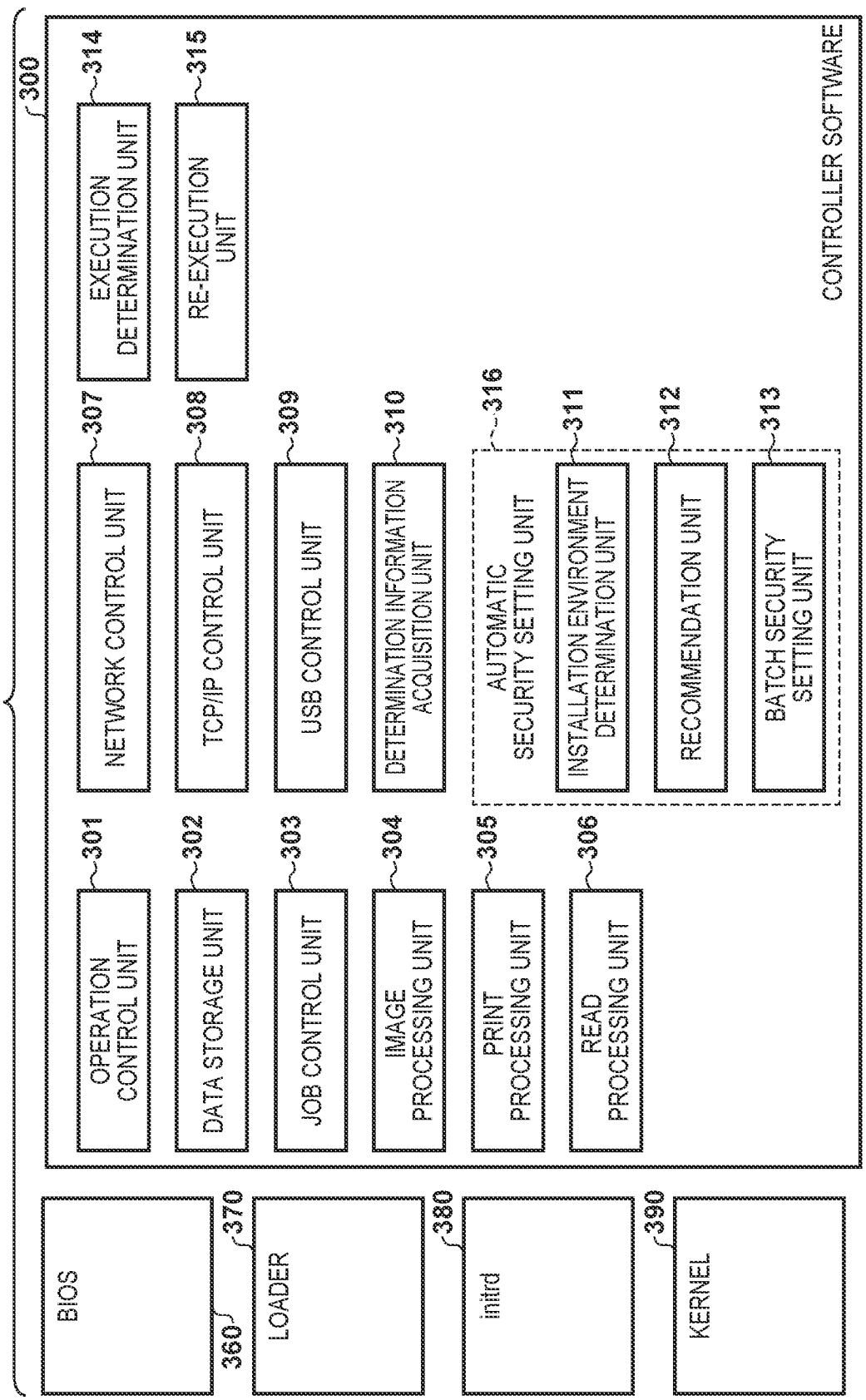

FIG. 4A

| INSTALLATION ENVIRONMENT | ENVIRONMENT DETERMINATION ELEMENT | | |
|---|---|---|---|
| | PHYSICAL BOUNDARY | NETWORK BOUNDARY | INTERNET CONNECTION |
| HOME | ○ | × | ○ |
| OFFICE | ○ | ○ | × |
| FULLY ISOLATED | ○ | × | × |

| INSTALLATION ENVIRONMENT | RECOMMENDED SECURITY SETTING | | |
|---|---|---|---|
| | FIREWALL | COMMUNICATION PATH ENCRYPTION | HDD ENCRYPTION |
| OFFICE | ○ | ○ | ○ |
| HOME | × | ○ | × |
| FULLY ISOLATED | × | × | × |

| INSTALLATION ENVIRONMENT | RECOMMENDED SECURITY SETTING | | |
|---|---|---|---|
| | FIREWALL | COMMUNICATION PATH ENCRYPTION | HDD ENCRYPTION |
| OFFICE | ○ | ○ | ○ |
| HOME | × | ○ | × |
| (DEFAULT VALUE) | × | ○ | × |
| FULLY ISOLATED | × | × | × |

SECURITY LEVEL: HIGH → MEDIUM → LOW

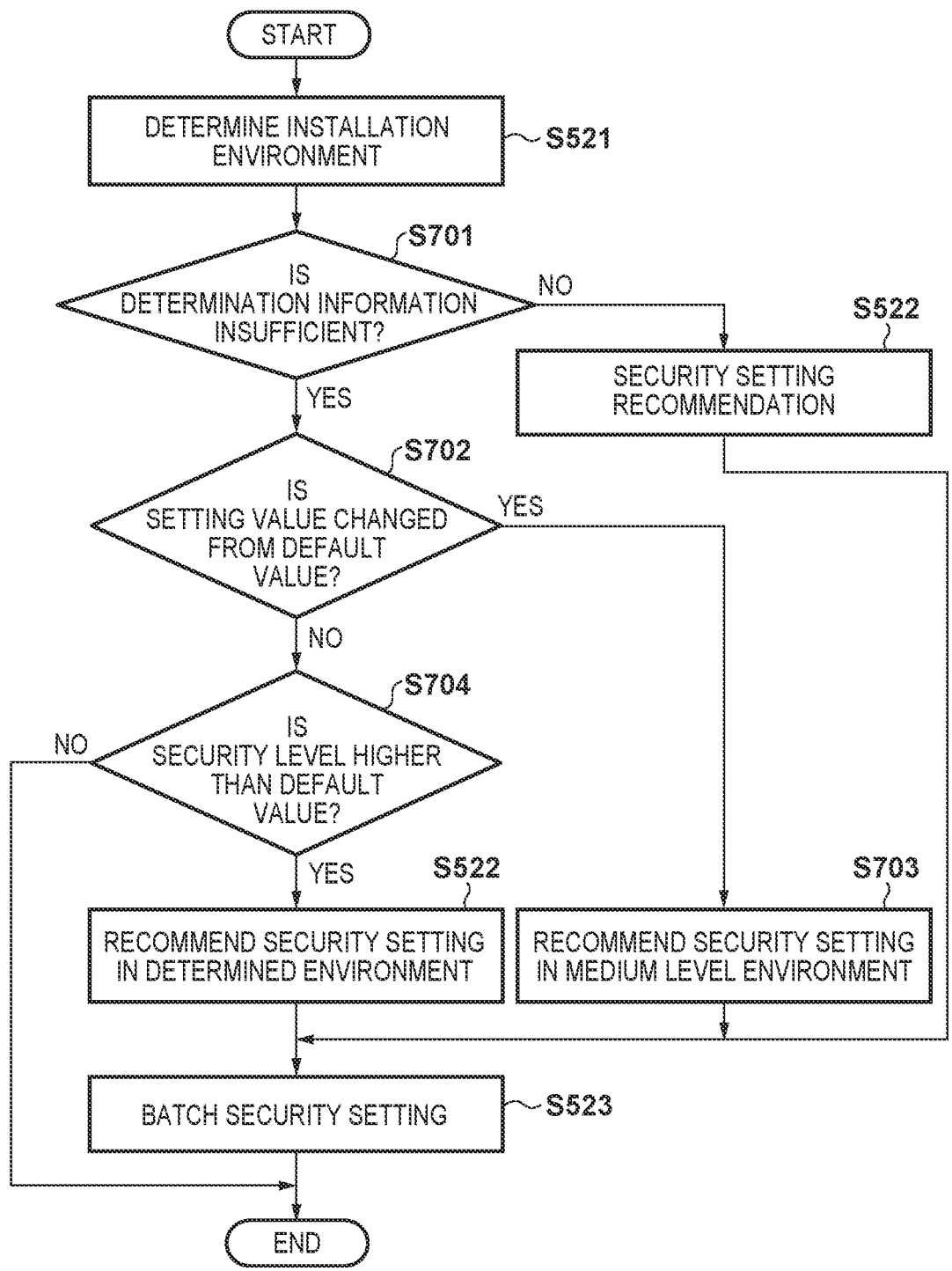

INFORMATION PROCESSING APPARATUS, CONTROL METHOD OF INFORMATION PROCESSING APPARATUS, AND STORAGE MEDIUM

BACKGROUND OF THE INVENTION

Field of the Invention

The present invention relates to an information processing apparatus, a control method of the information processing apparatus, and a storage medium.

Description of the Related Art

In recent years, there is a wide variety of environments in which an information processing apparatus, such as a personal computer (PC) or a multi-function peripheral (MFP), is installed. These devices may be installed in a room where an entry is managed, such as an office, or may be installed at a public place to which everyone is physically accessible, such as a convenience store. Besides, a case where an information processing apparatus of a company is installed at home to be used for telework has also been increasing. Furthermore, along with an increase in security functions provided by the information processing apparatus, security setting is complicated, and a user of the information processing apparatus needs to determine whether a large number of security setting items should be enabled and set them one by one.

In Japanese Patent Laid-Open No. 2016-62558, by using information on another device, such as a monitor camera and a human presence sensor, an installation environment of an MFP is determined to batch-execute a plurality of security settings appropriate for the installation environment automatically, thus reducing the effort of user settings.

However, the technique disclosed in Japanese Patent Laid-Open No. 2016-62558 does not consider a case of insufficient information for determining an installation environment of an MFP, such as immediately after installation of the MFP. For example, since it is immediately after installation of the MFP, when connection with another device, such as a monitor camera, has not been established, information on the installation environment cannot be acquired, and an improper security setting is possibly executed. In addition, in the case of the technique disclosed in Japanese Patent Laid-Open No. 2016-62558, there is a possibility that the information for executing the installation environment determination is not sufficiently accumulated immediately after installation of the MFP, and appropriate environment determination cannot be executed. For example, in a case where installation environment determination is executed after days, such as holidays, during which there were not so many users unexpectedly continued immediately after installation of the MFP, although there are many users usually, it is erroneously determined that there are not so many users, and a low security level is possibly set.

SUMMARY OF THE INVENTION

The present invention has been made in view of the above problems, and provides a technique for suppressing continuation of improper security setting.

According to one aspect of the present invention, there is provided an information processing apparatus, comprising a setting unit that executes a security setting on the information processing apparatus based on an installation environment of the information processing apparatus, wherein the setting unit executes the security setting again at a specific timing.

Further features of the present invention will become apparent from the following description of exemplary embodiments (with reference to the attached drawings).

BRIEF DESCRIPTION OF THE DRAWINGS

FIG. 3 is a block configuration diagram of software executed within the controller in the MFP according to the first embodiment.

FIG. 4A, FIG. 4B, and FIG. 4C are correspondence tables related to an installation environment and a recommended security setting according to the first embodiment and a security level according to a second modification.

FIG. 7 is a flowchart for executing processing according to a second modification of the first embodiment.

DESCRIPTION OF THE EMBODIMENTS

Figure 1:
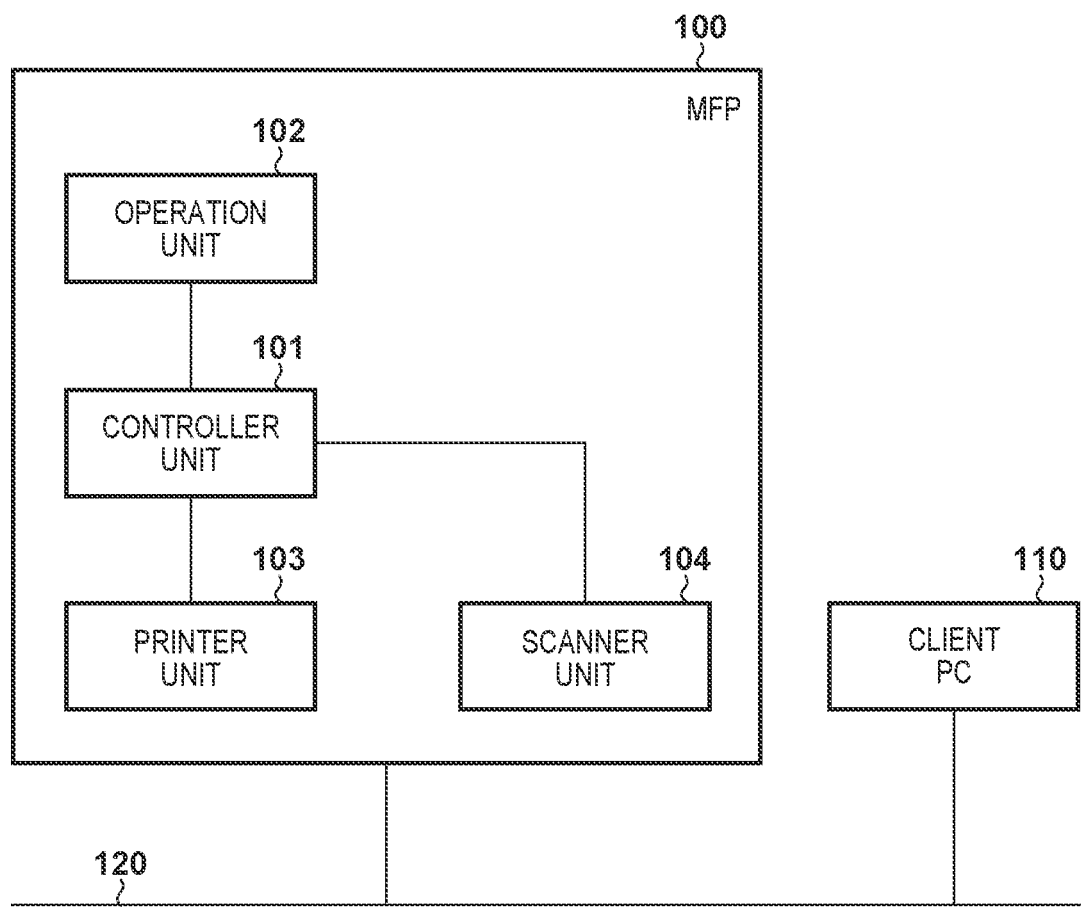
FIG. 1 is a block configuration diagram illustrating a connection configuration between an MFP and a PC according to the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

In the present embodiment, processing for re-executing automatic security settings (installation environment determination and security setting) at a specific timing by an information processing apparatus will be described. In the embodiments of this document, the information processing apparatus will be described as a multi-function peripheral (MFP), which is an image forming apparatus, but the embodiments are applicable to an information processing apparatus other than a multi-function peripheral.

First Embodiment

System Configuration of First Embodiment

A connection configuration of an information processing system including the multi-function peripheral (MFP), which functions as the information processing apparatus according to the present embodiment, and a client PC will be described with reference to the block diagram of FIG. 1.

An MFP 100 and a client PC 110 are connected via a LAN 120. The MFP 100 includes a controller unit 101, an operation unit 102 for input/output by a user, a printer unit 103 for outputting electronic data to a paper medium, and a scanner unit 104 for reading the paper media and converting it into electronic data. The operation unit 102, the printer unit 103, and the scanner unit 104 are connected to the controller unit 101 and achieve a function as the multi-function peripheral in accordance with control by the controller unit 101. The client PC 110 executes processing, such as transmission of a print job to the MFP 100.

Hardware Configuration of Controller Unit 101

Figure 2:
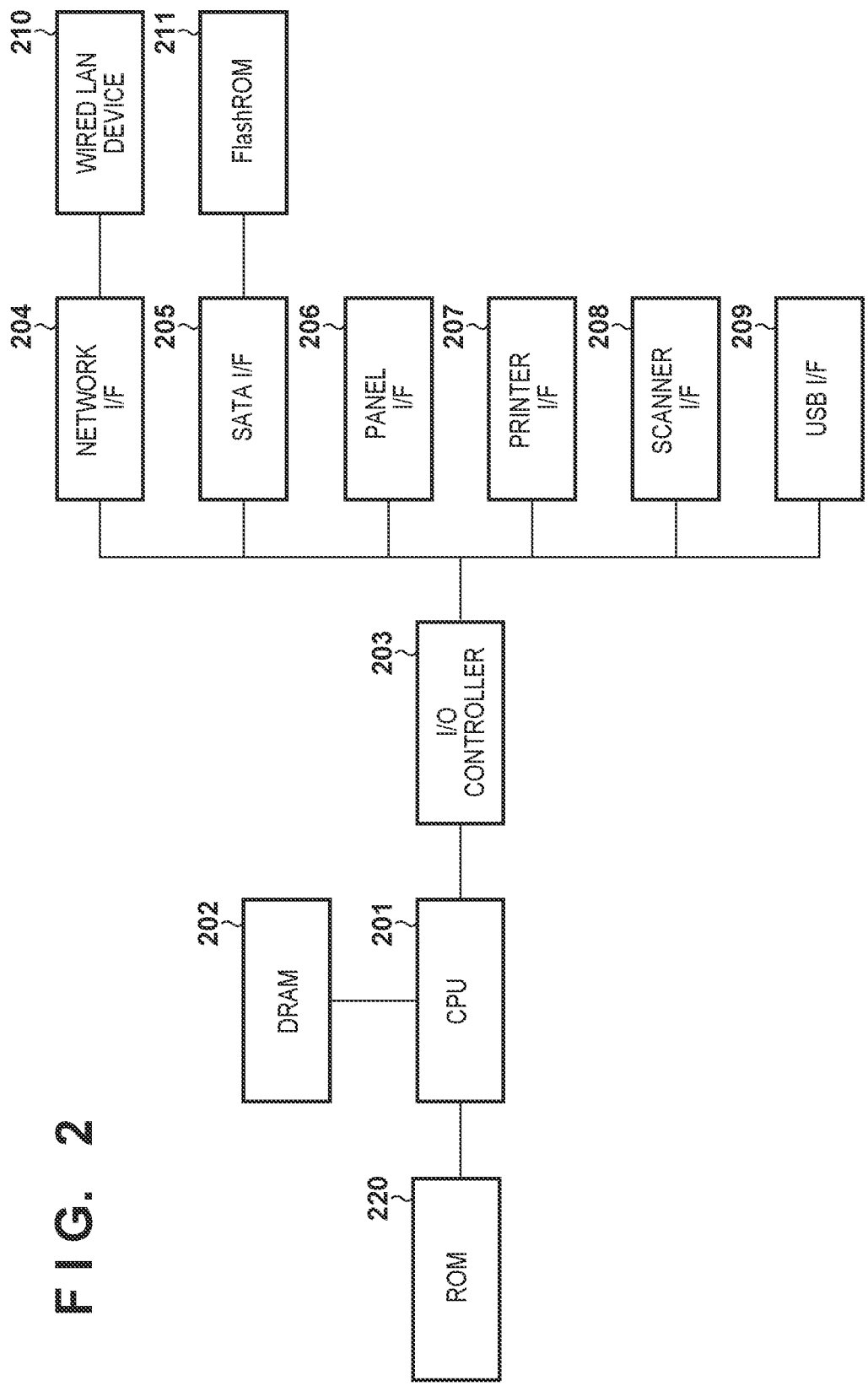
FIG. 2 is an internal configuration diagram of a controller unit of the MFP according to a first embodiment.

FIG. 2 is a block diagram illustrating details of the controller unit 101 in the MFP 100. A CPU 201 executes main arithmetic processing in the controller. The CPU 201 is connected to a DRAM 202 via a bus. The DRAM 202 is used by the CPU 201 as a work memory for temporarily locating program data representing an arithmetic instruction in a process of operation by the CPU 201 and data to be processed. The CPU 201 is connected to an I/O controller 203 via the bus. The I/O controller 203 executes input/output to/from various devices in response to an instruction from the CPU 201. To the I/O controller 203, a Serial Advanced Technology Attachment (SATA) I/F 205 is connected, and a Flash ROM 211 is connected ahead of the SATA I/F 205. The CPU 201 uses the Flash ROM 211 to permanently store a program to achieve the function of the MFP 100 and a document file. A network I/F 204 is connected to the I/O controller 203. A wired LAN device 210 is connected ahead of the network I/F 204.

The CPU 201 controls the wired LAN device 210 via the network I/F 204 to achieve communications on the LAN 120. Additionally, a panel I/F 206 is connected to the I/O controller 203, and the CPU 201 achieves input/output for a user to the operation unit 102 via the panel I/F 206. Additionally, a printer I/F 207 is connected to the I/O controller 203, and the CPU 201 achieves output processing of a paper medium using the printer unit 103 via the printer I/F 207. In addition, to the I/O controller 203, a scanner I/F 208 is connected, and the CPU 201 achieves reading processing of a document using the scanner unit 104 via the scanner I/F 208. Also, a USB I/F 209 is connected to the I/O controller 203, and the CPU 201 controls any device connected to the USB I/F 209. A ROM 220 is connected to the CPU 201 with a bus, and stores a control program that achieves a Basic Input Output System (BIOS) 360 described later.

To execute a copy function, the CPU 201 reads program data from the Flash ROM 211 to the DRAM 202 via the SATA I/F 205. In accordance with the program read to the DRAM 202, the CPU 201 detects a copy instruction from the user to the operation unit 102 via the panel I/F 206. When the CPU 201 detects the copy instruction, the CPU 201 receives the document from the scanner unit 104 via the scanner I/F 208 as electronic data and stores it in the DRAM 202. The CPU 201 executes, for example, color conversion processing suitable for output on image data stored in the DRAM 202. The CPU 201 transfers the image data stored in the DRAM 202 to the printer unit 103 via the printer I/F 207, and executes output processing on a paper medium.

In a case where Page Design Language (PDL) print is executed, the client PC 110 executes a print instruction via the LAN 120. The CPU 201 reads program data from the Flash ROM 211 via the SATA I/F 205 to the DRAM 202 and detects a print instruction via the network I/F 204 in accordance with the program read to the DRAM 202. When the CPU 201 detects a PDL transmission instruction, the CPU 201 receives the print data via the network I/F 204, and stores the print data on the Flash ROM 211 via the SATA I/F 205. When storage of the print data is completed, the CPU 201 loads the print data stored in the Flash ROM 211 as image data to the DRAM 202. The CPU 201 executes, for example, color conversion processing suitable for output on the image data stored in the DRAM 202. The CPU 201 transfers the image data stored in the DRAM 202 to the printer unit 103 via the printer I/F 207, and executes output processing on a paper medium.

Hereinafter, a re-execution processing flow of an automatic security setting according to a functional configuration and an environment in the present embodiment will be described.

Functional Configuration of First Embodiment

Next, with reference to the block diagram in FIG. 3, an example of the functional configuration in which software executed by the controller unit 101 in the MFP 100 according to the first embodiment is achieved will be described. Note that all software executed by the controller unit 101 is executed by the CPU 201.

The CPU 201 executes the BIOS 360 stored in the ROM 220. The CPU 201 reads a loader 370, an initrd 380, and controller software 300 stored in the Flash ROM 211 to the DRAM 202 and then executes them. The BIOS 360 executes basic processing for the CPU 201 to control the I/O controller 203 and the DRAM 202. Further, the BIOS 360 includes executing processing to read the loader 370 from the Flash ROM 211 and start the loader 370. The loader 370 reads a kernel 390 and the initrd 380 from the Flash ROM 211 and executes processing of start. The initrd 380 executes processing of reading the controller software 300 from the Flash ROM 211 and starting the controller software 300.

Figure 8:
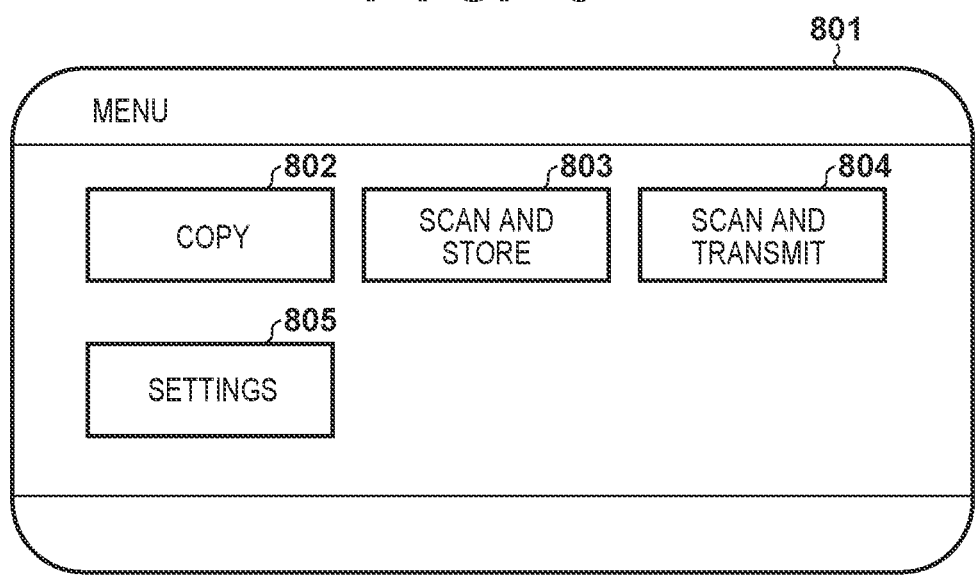
FIG. 8 is a configuration diagram of a menu display screen.

An operation control unit 301 is a user interface (UI) unit that displays a screen image for a user via the operation unit 102, detects a user operation, or executes processing associated with a screen component, such as a button, displayed on the screen. For example, a menu screen 801 as illustrated in FIG. 8 is displayed. FIG. 8 is the menu screen 801 displayed on the operation unit 102, and is for the user to instruct to execute various functions that the multi-function peripheral has. A button 802 is used to instruct the copy function by the user. A button 803 is used to instruct a function to scan and store by the user. A button 804 is used to instruct a function to scan and transmit by the user. A button 805 is used to instruct setting change of a device by the user.

Figure 9:
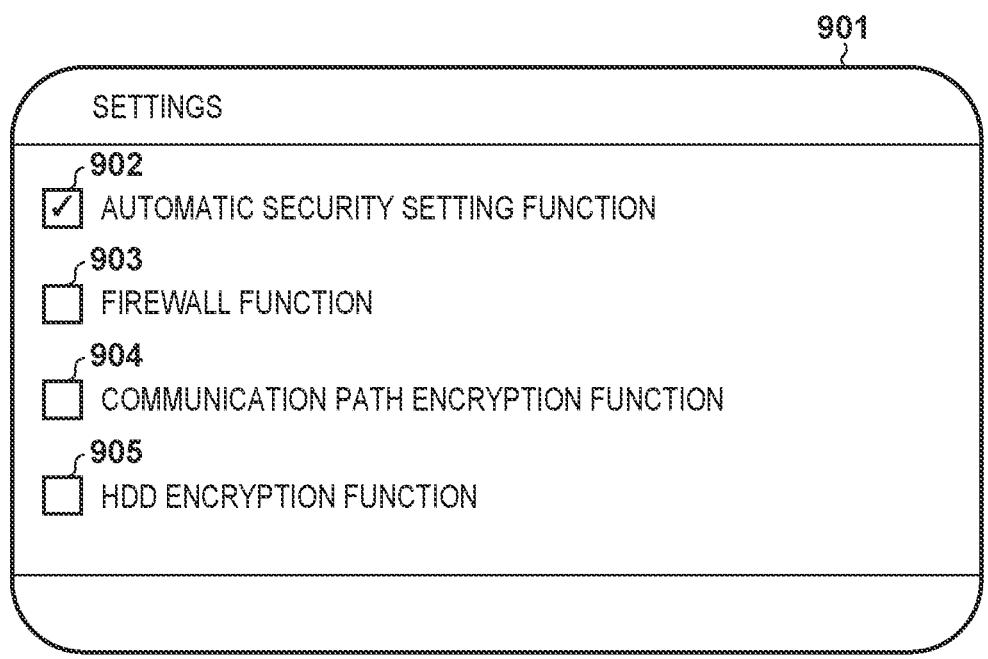
FIG. 9 is a configuration diagram of a setting display screen.

By pressing the button 805, a screen further transitions to a setting screen 901 exemplified in FIG. 9, and individual setting can be changed. FIG. 9 is a diagram illustrating the setting screen 901 that is a screen for the user to instruct the setting change regarding various functions included in the MFP 100. A check box 902 is used to enable an automatic security setting function. A check box 903 is used to enable a firewall function. A check box 904 is used to enable a communication path encryption function. A check box 905 is used to enable an HDD encryption function.

For example, by selecting the check box 902, the automatic security setting function is enabled, and security setting recommendation/batch setting according to an environment in the present embodiment is executed. The above-described configuration is merely an example, and, for example, setting change of a user authentication function or a log recording function may be instructed via the setting screen 901.

In FIG. 3, a data storage unit 302 stores data or reads data in/from the Flash ROM 211 upon a request from another control unit. For example, when the user desires to change any device setting, the operation control unit 301 detects contents input by the user on the operation unit 102, and the data storage unit 302 stores the content in the Flash ROM 211 as a setting value upon a request from the operation control unit 301. For example, by selecting the check box 903 in FIG. 9 described above, the firewall function is enabled, and simultaneously the data storage unit 302 stores the setting value indicating that the firewall function is enabled in the Flash ROM 211.

A job control unit 303 controls job execution in accordance with the instruction from another control unit. An image processing unit 304 processes the image data in a format suitable for each application according to the instruction from the job control unit 303. A print processing unit 305 prints an image on a paper medium via the printer I/F 207 in response to the instruction from the job control unit 303 and outputs it.

A read processing unit 306 reads a placed document via the scanner I/F 208 in response to the instruction from the job control unit 303. A network control unit 307 executes a network setting, such as an IP address, on a TCP/IP control unit 308 at the start of the system and detection of setting change in accordance with the setting value stored in the data storage unit 302. The TCP/IP control unit 308 executes transmission/reception processing of a network packet via the network I/F 204 in response to the instruction from another control unit. A USB control unit 309 controls the USB I/F 209, and controls any USB-connected device.

A determination information acquisition unit 310 has a function of acquiring determination information, which is information used for installation environment determination of the MFP 100, and passing it to an installation environment determination unit 311 and an execution determination unit 314 described later. The determination information acquisition unit 310 acquires, as determination information, information available for installation environment determination among information (data) stored in the MFP 100. As the determination information, for example, information related to presence or absence of a network boundary, information related to presence or absence of Internet connection, and information related to presence or absence of a physical boundary that divides the environment where the MFP 100 is disposed into inside and outside can be acquired/used.

Hereinafter, the information available as the determination information will be exemplified. For example, an IP address of a proxy server stored as a setting value of the MFP 100 in the data storage unit 302 can be used as the determination information. At this time, when the IP address of the proxy server is set, it can be determined that there is a network boundary. Meanwhile, when the IP address is not set, it can be determined that there is no network boundary. Also, the IP address of the MFP 100 stored as the setting value of the MFP 100 in the data storage unit 302 can also be used as the determination information. At this time, when a global IP address is set as the IP address of the MFP 100, it can be determined that Internet connection is present. Meanwhile, when a private IP address is set, it can be determined that Internet connection is absent. Note that since presence or absence of a physical boundary is difficult to be determined from the information that can be collected in the normal operation of the MFP 100, for example, information related to the presence or absence of the physical boundary is input by the user via the UI, and the input information can be used as determination information.

Note that the determination information of the presence or absence of the network boundary or the presence or absence of Internet connection described above is an example, and other information may be used for the determination. For example, as long as setting regarding firewall has been made in the data storage unit 302 as the setting value of the MFP 100, it is possible to determine that the network boundary is present, and when the setting regarding firewall has not been made, it is possible to determine that the network boundary is absent. In addition, for example, a data packet flowing in the network control unit 307 may be learned by an artificial intelligence (AI) technique, such as machine learning or deep learning, and generated and stored as determination information related to the presence or absence of the network boundary to determine the installation environment.

The installation environment determination unit 311 determines an environment in which the MFP 100 is installed using the determination information acquired by the determination information acquisition unit 310. A determination method for installation environment can be achieved by the use of, for example, a table 401 in FIG. 4A. The table 401 in FIG. 4A is a correspondence table that maps the installation environment on the vertical axis and environment determination element that can be acquired from the determination information on the horizontal axis. In the case of FIG. 4A, for example, when it is determined as "with physical boundary," "no network boundary," or "with Internet connection" from the determination information, it is determined that the MFP 100 is installed in a home and a home environment as a telework environment.

In addition, when it is determined as "with physical boundary," "with network boundary," or "no Internet connection," it is determined that the MFP 100 is installed in an office environment, such as a company. When it is determined as "with physical boundary," "no network boundary," or "no Internet connection," it is determined that the MFP 100 is installed in a fully isolated environment, which is an environment fully isolated from the Internet.

Note that "physical boundary," "network boundary," and "Internet connection," which are the environment determination elements of the table 401, are examples, and another environment determination element may be combined. Additionally, "home," "office," "full isolation," which are the installation environments, are also examples, and as another installation environment, an environment where high security is requested, such as "bank," may be added separately. In addition, determination criteria of installation environment may be changed by changing the correspondence of "Good" and "Poor" for the installation environments and the environment determination elements in the table 401. For example, by changing the physical boundary of the home from "Good" to "Poor," changes can be made such that the environment of "no physical boundary," "no network boundary," and "with Internet connection" is determined as the home environment.

A recommendation unit 312 recommends the security setting appropriate for the environment to the user according to the installation environment determined by the installation environment determination unit 311. The recommendation of the security setting suitable appropriate for each installation environment can be achieved by, for example, the use of a table 402 in FIG. 4B. The table 402 in FIG. 4B is a correspondence table that maps the installation environment on the vertical axis and recommended security setting on the horizontal axis.

In the case of FIG. 4B, for example, in a case where the installation environment determination unit 311 determines the office environment as the installation environment, a firewall function "enable," a communication path encryption function "enable," and an HDD encryption function "enable" are recommended as the recommended security setting. In a case where the installation environment is determined to be the home environment, the firewall function "disable," the communication path encryption function "enable," and the HDD encryption function "disable" are recommended as the recommended security setting. In a case where the installation environment is determined as a fully isolated environment, the firewall function "disable," the communication path encryption function "disable," and the HDD encryption function "disable" are recommended as the recommended security setting.

Figure 11:
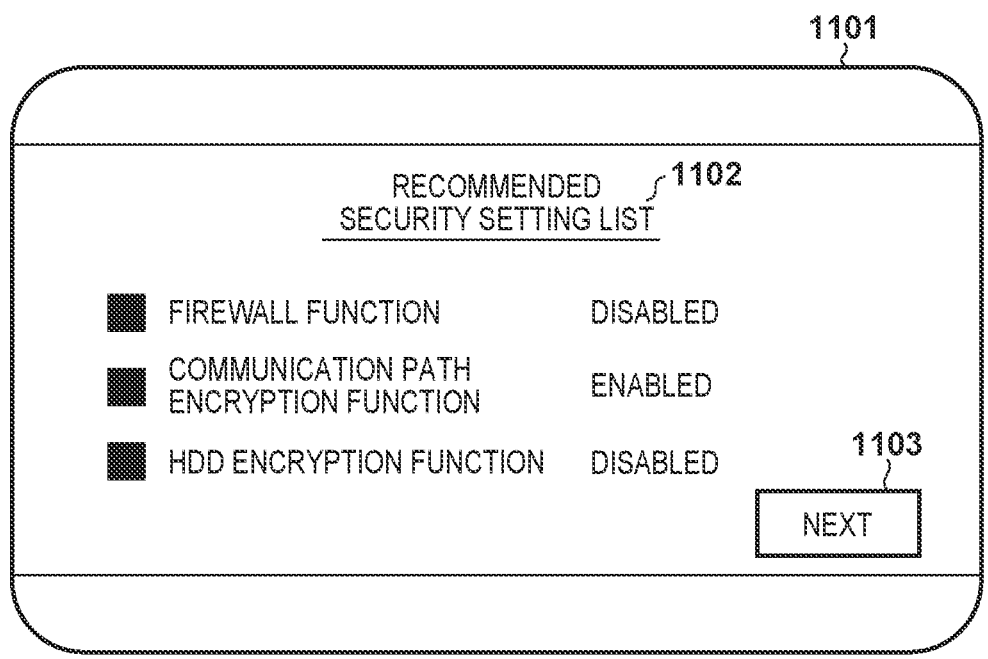
FIG. 11 is a configuration diagram of a recommendation screen of recommended security setting.

The specific recommendation method to the user, for example, as illustrated in FIG. 11, displays a recommended security setting screen 1101 on the operation unit 102 and displays the respective security settings as a recommended security setting list 1102 on it. For example, in a case where the installation environment is determined as the home environment, in accordance with the table 402 in FIG. 4B, as the recommended security setting list 1102, the firewall function "disable," the communication path encryption function "enable," and the HDD encryption function "disable" are displayed. Note that similarly to the table 401, "home," "office," and "full isolation," which are the installation environments of the table 402, are examples, and other installation environments may be added.

Further, the recommended security setting is also an example, and, for example, as another security setting item, a setting related to an alteration detection function may be added. Additionally, the correspondence of "Good" and "Poor" of the installation environments and the recommended security settings in the table 402 may be changed. For example, changing the firewall of the home from "Poor" to "Good" allows the firewall function "enable," the communication path encryption function "enable," and the HDD encryption function "disable" to be changed so as to be recommended as the recommended security setting of the home environment.

Figure 12:
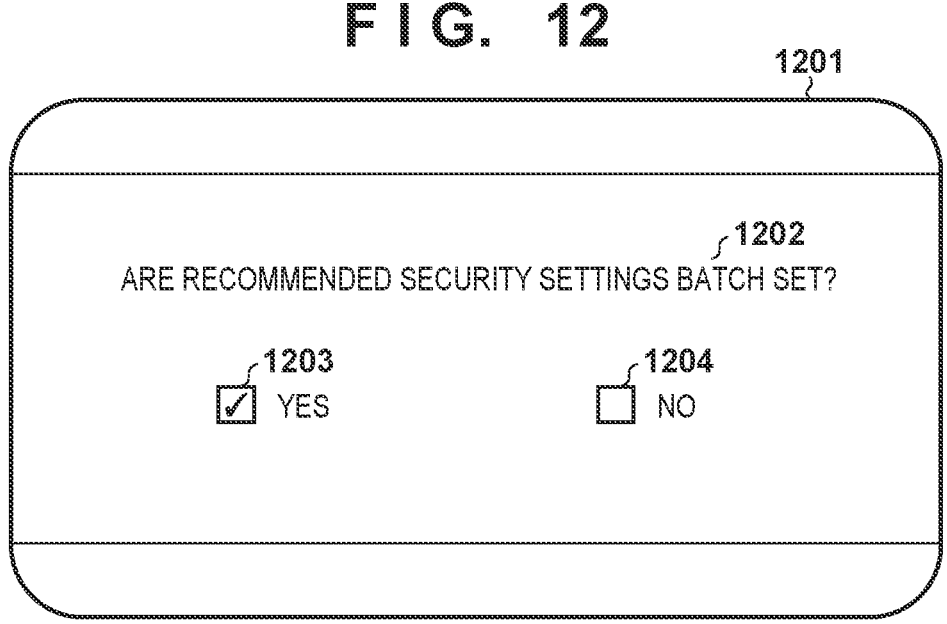
FIG. 12 is a configuration diagram of a batch setting screen of the recommended security setting.

A batch security setting unit 313 batch-sets the recommended security settings recommended by the recommendation unit 312 to the MFP 100. For example, pressing a button 1103 of the recommended security setting screen 1101 transitions the screen to a batch setting screen 1201 illustrated in FIG. 12. In the batch setting screen 1201, a question on availability of batch setting is displayed on a display region 1202 to ask for determination of the user. When the user selects a check box 1203 ("YES"), the batch security setting unit 313 follows the table 402 in FIG. 4B for each installation environment, and executes setting of each of the security functions and enable/disable processing of the functions. The recommendation display may be configured to be displayed when an administrator logs in the MFP 100.

For example, in a case where the installation environment is determined to be the home environment, the batch security setting unit 313 stores values indicating the firewall function "disable," the communication path encryption function "enable," and the HDD encryption function "disable" as the setting values in the data storage unit 302. The CPU 201 simultaneously executes enable/disable processing of various functions. On the other hand, when the user selects a check box 1204 ("NO"), the security setting is not executed, and the processing is terminated as is by, for example, transitioning the screen to the menu screen 801.

Note that, hereinafter, the installation environment determination unit 311, the recommendation unit 312, and the batch security setting unit 313 may be collectively referred to as an automatic security setting unit 316, which is a function of executing automatic security setting.

The execution determination unit 314 determines whether the automatic security setting processing needs to be re-executed by the automatic security setting unit 316 in accordance with the determination information acquired by the determination information acquisition unit 310. For example, in a case where the IP address of the MFP 100 can be acquired as the determination information by the determination information acquisition unit 310, it is determined that re-execution is unnecessary, and in a case where the IP address cannot be acquired, it is determined that re-execution is necessary. By determining a condition that becomes a reference to determine necessity/unnecessity of re-execution, it is possible to determine whether the re-execution of automatic security setting is necessary according to the determination information.

This is merely an example and may be determined by another method. For example, in a case where data packets flowing in the network control unit 307 and an amount of information of log information of the MFP 100 stored in the data storage unit 302 are accumulated by an amount exceeding a predetermined threshold value, it may be determined that re-execution is unnecessary, and when not accumulated, it may be determined that re-execution is necessary. Further, the execution determination unit 314 generates a flag representing necessity/unnecessity of re-execution for re-execution of the automatic security setting processing by a re-execution unit 315 described later as needed. For example, it can be achieved by generating binary data in which "1" indicates that re-execution is necessary and "0" indicates that re-execution is unnecessary as a re-execution flag and storing it in the data storage unit 302.

Note that, hereinafter, setting the re-execution flag such that re-execution is necessary is referred to as "enable the re-execution flag" and on the other hand, setting the re-execution flag such that re-execution is unnecessity is referred to as "disable the re-execution flag" is some cases. In a case where the value of the re-execution flag does not change between before and after the operation of the re-execution flag, the operation of the re-execution flag may be skipped. For example, in a case where the enable processing of the re-execution flag is executed with the current re-execution flag being "1 (enable)," the execution determination unit 314 skips the enable processing.

The re-execution unit 315 requests the automatic security setting unit 316 to execute the automatic security setting processing according to the re-execution flag generated by the execution determination unit 314. For example, the re-execution flag stored in the data storage unit 302 is checked, and when the flag is "1 (enable)," it is determined that the re-execution is necessary. At this time, it is determined whether the determination information by the amount of information excessing the threshold value is accumulated via the execution determination unit 314. When the execution determination unit 314 determines that the re-execution is necessary (the determination information is insufficient), it is determined that the determination information necessary for environment determination is not sufficiently accumulated, and it is waited until the determination information is stored.

On the other hand, in a case where the execution determination unit 314 determines that re-execution is unnecessary (the determination information is sufficiently accumulated), the execution determination unit 314 requests the automatic security setting unit 316 for the automatic security setting processing. At this time, the automatic security setting unit 316 executes the installation environment determination by the installation environment determination unit 311, the security setting recommendation by the recommendation unit 312, and the batch setting processing by the batch security setting unit 313. Thus, in a case where it is determined that the determination information does not satisfy the predetermined condition, the security setting can be executed again as a timing at which the determination information satisfies the predetermined condition as a specific timing. In the foregoing, the functional configuration according to the present embodiment has been described.

Processing Flow of First Embodiment

Next, with reference to the flowcharts in FIG. 5A to FIG. 5C, a procedure of re-execution processing of the automatic security setting according to the environment executed by the information processing apparatus according to the present embodiment will be described.

Processing Flow Description at First Execution

First, using FIG. 5A, the processing flow when the automatic security setting function is enabled for the first time after installation of the MFP 100 will be described.

Via the operation control unit 301, the user instructs the MFP 100 to enable the automatic security setting function (S501). The determination information acquisition unit 310 acquires the determination information (S502). The execution determination unit 314 determines necessity/unnecessity of re-execution based on the determination information (S503). In the case of the re-execution being necessary, the execution determination unit 314 enables the re-execution flag (S504), and executes the automatic security setting processing by the automatic security setting unit 316 (S506). On the other hand, in a case where the re-execution is unnecessary, the execution determination unit 314 disables the re-execution flag (S505), and executes the automatic security setting processing (S506).

Here, the automatic security setting processing in S506 will be described using FIG. 5C.

The installation environment determination unit 311 determines the installation environment using the determination information acquired by the determination information acquisition unit 310 (S521). In accordance with the installation environment determined in S521, the recommendation unit 312 recommends the security setting (S522). The batch security setting unit 313 batch-sets the security setting that has been recommended in S522 (S523).

Processing Flow Description After First Time

Next, the processing flow after enabling the automatic security setting function is executed for the first time described above will be described using FIG. 5B. Note that the present processing flow can be executed as background processing during a normal operation of the MFP 100.

The re-execution unit 315 checks the re-execution flag (S511), and when the flag is disabled (No in S512), the processing is terminated as is. On the other hand, when the re-execution flag is enabled (Yes in S512), the re-execution unit 315 acquires the determination information by the determination information acquisition unit 310 (S513), and the execution determination unit 314 determines the necessity of re-execution (S514). When it is determined that re-execution is necessary in S514, it is waited until the determination information is sufficiently accumulated (S513, S514). On the other hand, in a case where it is determined that re-execution is unnecessary in S514, it is determined that the determination information is sufficiently accumulated, the execution determination unit 314 disables the re-execution flag (S515), and the re-execution unit 315 requests the automatic security setting unit 316 for the automatic security setting processing (S506). Upon receiving the request, the automatic security setting unit 316 executes the automatic security setting processing.

As described above, in the present embodiment, when the information required for installation environment determination is insufficient, for example, immediately after installing the MFP, the automatic security setting is re-executed later at an appropriate timing. Therefore, even when a wrong environment is recommended, for example, immediately after installing the MFP, the setting can be automatically corrected to the security setting appropriate for the installation environment later, and therefore a risk of the user continuously using the MFP with the improper security setting can be suppressed.

First Modification

In the present modification, the user re-executes the automatic security setting processing according to a timing (e.g., date and time preset by the user) set by the user.

Since the re-execution processing is executed in a background as described in the first embodiment, when the re-execution processing is run during the use of the MFP, normal processing, such as printing and scanning, possibly becomes slow. In the present modification, since the user can arbitrarily set the re-execution timing, for example, the date and time during which the MFP is not used can be designated as the re-execution timing. This allows re-executing the automatic security setting without affecting normal processing, such as printing or scanning.

In the present modification, functions different from those of the first embodiment will be described below. In the present modification, the execution determination unit 314 has a function of requesting an input of the re-execution timing to the user via the UI when the re-execution is determined to be necessary, in addition to the functions of the first embodiment. The input method for re-execution timing includes, for example, a method that causes the user to input date and time at which re-execution is executed via the operation control unit 301, which is a UI. In addition, it can be achieved by causing the user to select an interval for re-execution via the UI. At this time, for example, the user can select/set the interval of re-execution, such as "one week," "one month," and "two months." For example, when "one week" is selected/set, the re-execution unit 315 described later re-executes the automatic security setting once every other week. Note that the re-execution date and time and the interval input by the user are stored in the data storage unit 302 as information related to the re-execution timing.

In the present modification, in addition to the functions of the first embodiment, the re-execution unit 315 has a function of requesting re-execution of the automatic security setting processing according to information related to the re-execution timing stored in the data storage unit 302 by the execution determination unit 314. For example, in a case where the data storage unit 302 stores the information indicating "May 1, 2021, 10 pm" as the information regarding the re-execution timing, the re-execution unit 315 waits until "May 1, 2021, 10 pm" is reached. At the timing of "May 1, 2021, 10 pm," similar to the first embodiment, the re-execution determination processing in the execution determination unit 314 and the automatic security setting processing in the automatic security setting unit 316 are requested.

Note that, the method described above is merely an example, and as long as the method can designate the re-execution date and time, another method may be applied.

Hereinafter, the re-execution processing of the automatic security setting according to an environment in the present modification will be described. Note that the processing approximately similar to that of the first embodiment is denoted by the same numbers, the description thereof will be omitted, and different points will be described below.

Processing Flow Description at First Execution

First, using FIG. 6A, the processing flow when the automatic security setting function is enabled for the first time after installation of the MFP 100 in the present modification will be described. When the re-execution is necessary (Yes in S503), the execution determination unit 314 enables the re-execution flag (S504) and executes an input request of re-execution timing to the user (S601). Upon receiving the input request, the user inputs the re-execution timing.

Processing Flow Description After First Time

Next, the processing flow after enabling the automatic security setting function is executed for the first time described above in the present modification will be described using FIG. 6B. The re-execution unit 315 waits until the re-execution timing is reached (S611). When the re-execution timing is reached, the re-execution unit 315 requests the determination information acquisition unit 310 for determination information acquisition processing (S513) and requests the execution determination unit 314 for re-execution determination processing (S514). When it is determined that re-execution is necessary in S514, the execution determination unit 314 executes the input request of re-execution timing to the user (S613).

As described above, in the present modification, the user can arbitrarily set, for example, date and time during which the MFP is not used as the re-execution timing of the automatic security setting processing, and therefore an influence to the normal operation by the user can be suppressed.

Second Modification

In the present modification, in a case where the determination information is insufficient, the installation environment determination with the determination information is not executed, and the automatic security setting is executed according to the security level of the installation environment and the current setting value of the MFP. However, when the installation environment determination is executed in a state in which the determination information is insufficient, the installation environment may be erroneously determined, and the security setting lower than that for the actual installation environment is possibly recommended. Therefore, in the present modification, in a case where the determination information is insufficient, the security setting of the security level higher than the security setting of the installation environment determined from that is recommended. This can avoid a decrease in security level due to erroneous installation environment determination.

In the present modification, functions different from those of the first embodiment will be described below. In the present modification, in addition to the functions of the first embodiment, when the determination information is insufficient, the recommendation unit 312 follows a predetermined table 403 described later with reference to FIG. 4C to recommend the setting of a further high security level. Note that whether the determination information is insufficient can be determined from the determination result in the execution determination unit 314.

For example, in a case where the re-execution flag stored in the data storage unit 302 has a value indicating enable, it can be determined that the determination information is insufficient, and when the value indicates disable, it can be determined that the determination information is sufficient. The table 403 illustrated in FIG. 4C is a table in which a line indicating default values, which are initial setting values of the MFP 100, is added to the recommended security settings according to the installation environments in the table 402 described in the first embodiment, and the installation environments are arranged in the order of high security levels from the above. The recommendation unit 312 compares the current setting value of the MFP 100 with the default value of the table 403, and determines whether the setting value has been changed. When the current setting value remains in the default value, the security setting for each of the installation environments determined by the installation environment determination unit 311 and the security level of the default value are compared using the table 403, and the higher security level is recommended.

For example, when it is determined as the fully isolated environment by the installation environment determination unit 311, with reference to the table 403, it can be determined that the security level of the fully isolated environment is lower than that of the default value, and therefore remaining in the default value is recommended. On the other hand, when it is determined as the home environment by the installation environment determination unit 311, it can be determined that the security level is higher than the default value, and therefore the security setting of the home environment is recommended. On the other hand, when the setting value is changed from the default value, since the security levels cannot be compared using the table 403, the security setting of the security level "medium" as the standard security setting is recommended.

For example, in the case of the table 403, the recommended security setting for the home environment of the security level "medium" is recommended. Note that the security level and the default value described above are examples, and, for example, the correspondence relationship of Good and Poor in the table 403 may be changed to switch the security levels. In addition, in the present modification, the security setting recommended in the case of the setting value change from the default value being present is set to be the security level "medium," but this is an example. For example, the security level for the office environment "high" as the security level in the table 403 may be recommended.

Figure 5A:
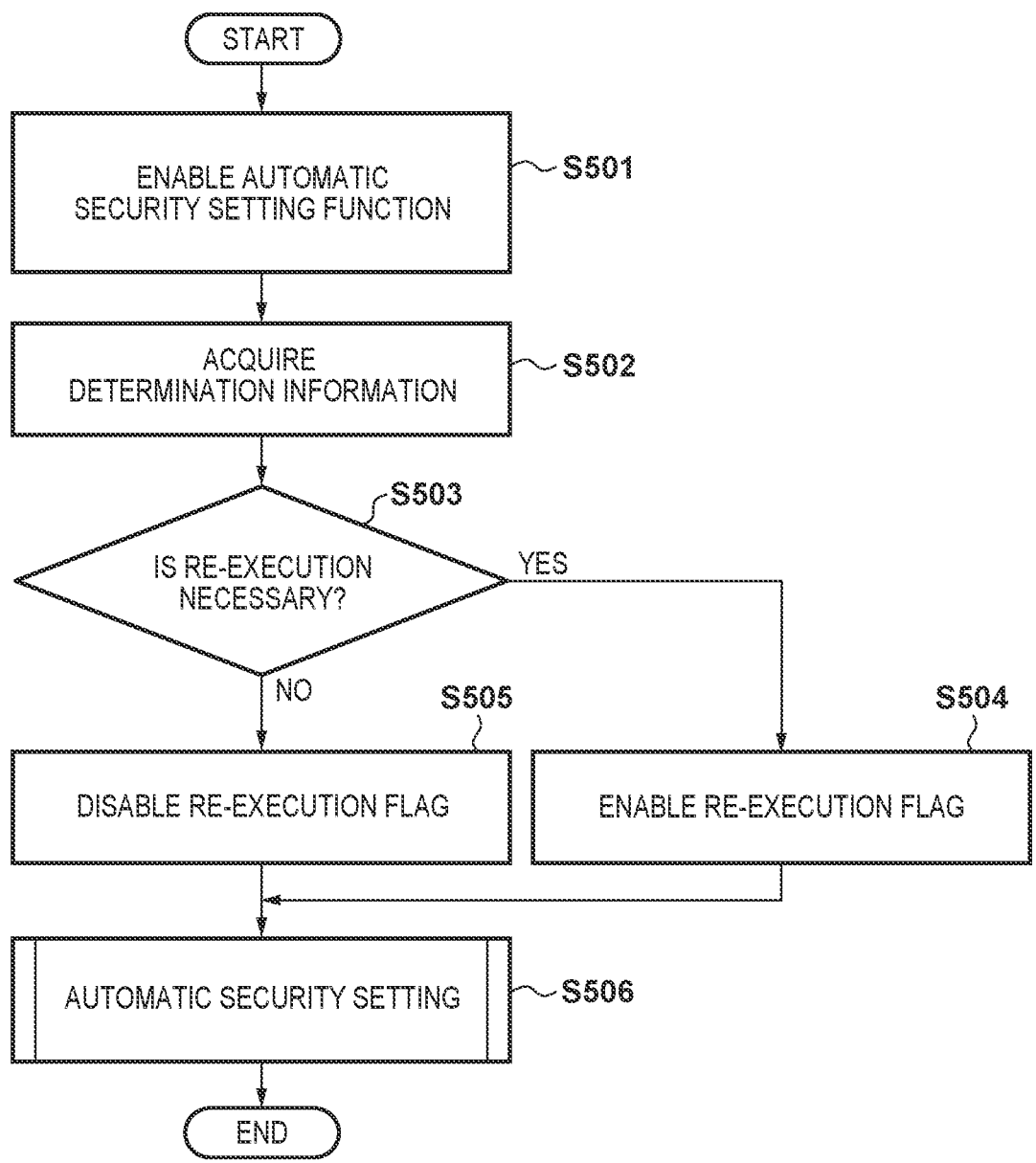
FIG. 5A, FIG. 5B, and FIG. 5C are flowcharts for executing processing according to the first embodiment.
Figure 5B:
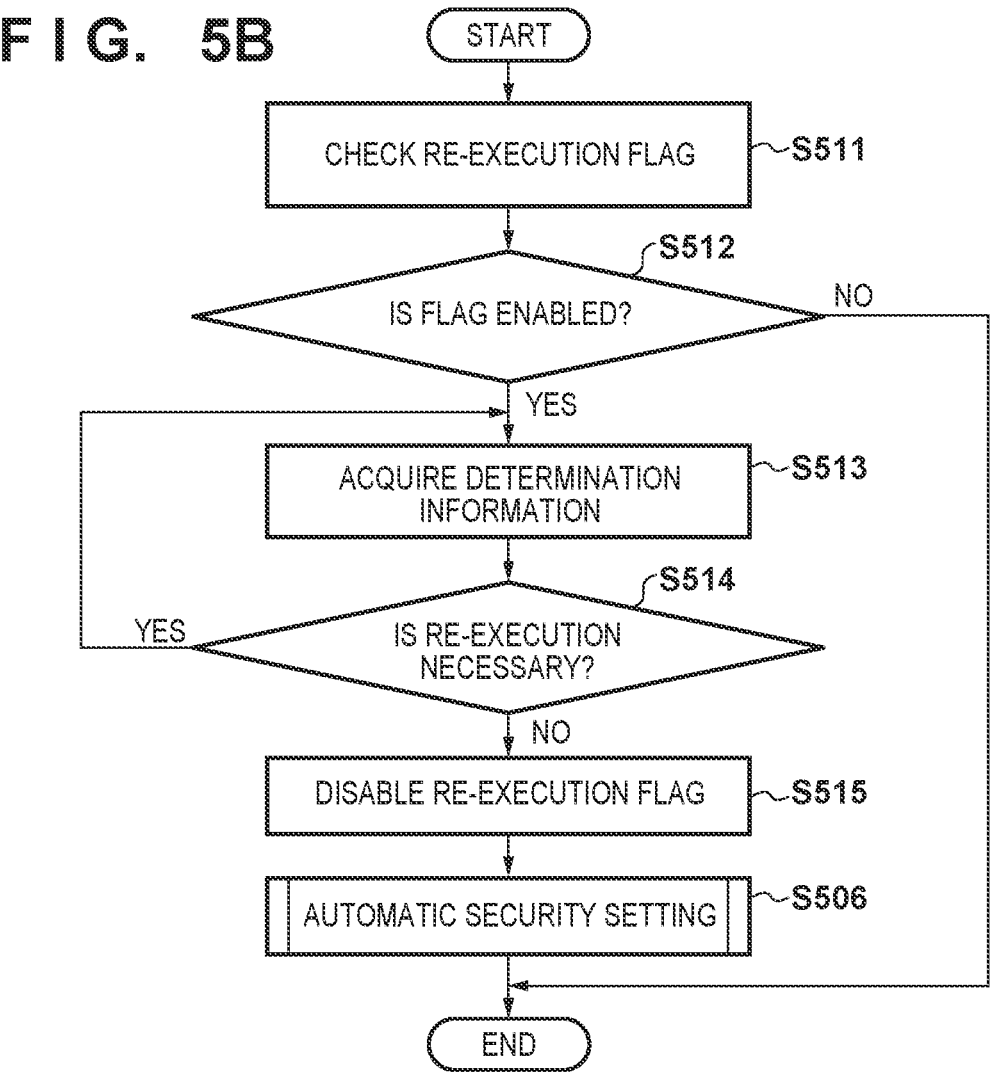
Figure 5C:
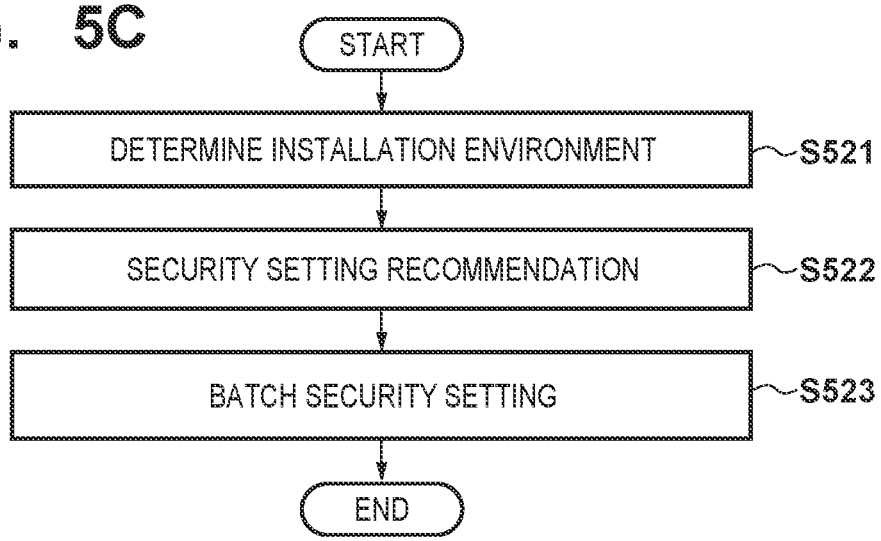

Next, FIG. 7 is a flowchart depicting details of the automatic security setting processing (S506) in FIG. 5C in the present modification. Hereinafter, points of the present modification (FIG. 7) different from the first embodiment (FIG. 5C) will be described.

The recommendation unit 312 determines whether the determination information is insufficient (S701). In a case where the determination information is sufficient (in a case where a predetermined condition is satisfied), the recommendation unit 312 recommends the security setting as is, and the batch security setting unit 313 executes the batch security setting (S522, S523). On the other hand, when the determination information is insufficient (in a case where the predetermined condition is not satisfied), the recommendation unit 312 determines whether the setting value has been changed from the default value (S702). When the setting value is determined to be changed from the default value, the security setting corresponding to the installation environment of the security level "medium" is recommended (S703), and the batch security setting unit 313 executes the batch security setting (S523).

On the other hand, when the setting value is determined to be not changed from the default value in S702, the recommendation unit 312 compares the security level of the security setting corresponding to the installation environment determined by the installation environment determination unit 311 and the security level of the default value (S704). When the default value is determined to have the higher security level in S704, the processing is terminated as is. On the other hand, in S704, in a case where the security setting corresponding to the installation environment determined by the installation environment determination unit 311 is determined to have the higher security level, the security setting corresponding to the installation environment is recommended (S522). Then, the batch security setting unit 313 executes the batch security setting (S523).

As described above, in the present modification, in a case where the determination information is insufficient, the setting with the further high security level is recommended and set. Therefore, the decrease in security level due to erroneous installation environment determination can be avoided.

Other Modifications

In addition to or instead of the determination information handled in the above-described embodiments and modifications thereof, the accumulated operating time of the MFP 100 can be used as determination information. At this time, when the accumulated operating time of the MFP, which is the determination information, is less than a threshold value, the execution determination unit 314 can determine that re-execution is necessary, and when the accumulated operating time exceeds the threshold value, the execution determination unit 314 can determine that re-execution is unnecessary.

Also, while only the information stored in the MFP 100 is handled as the determination information, this is an example. For example, information stored on a server that can communicate with the MFP 100 can be handled as determination information.

Figure 6A:
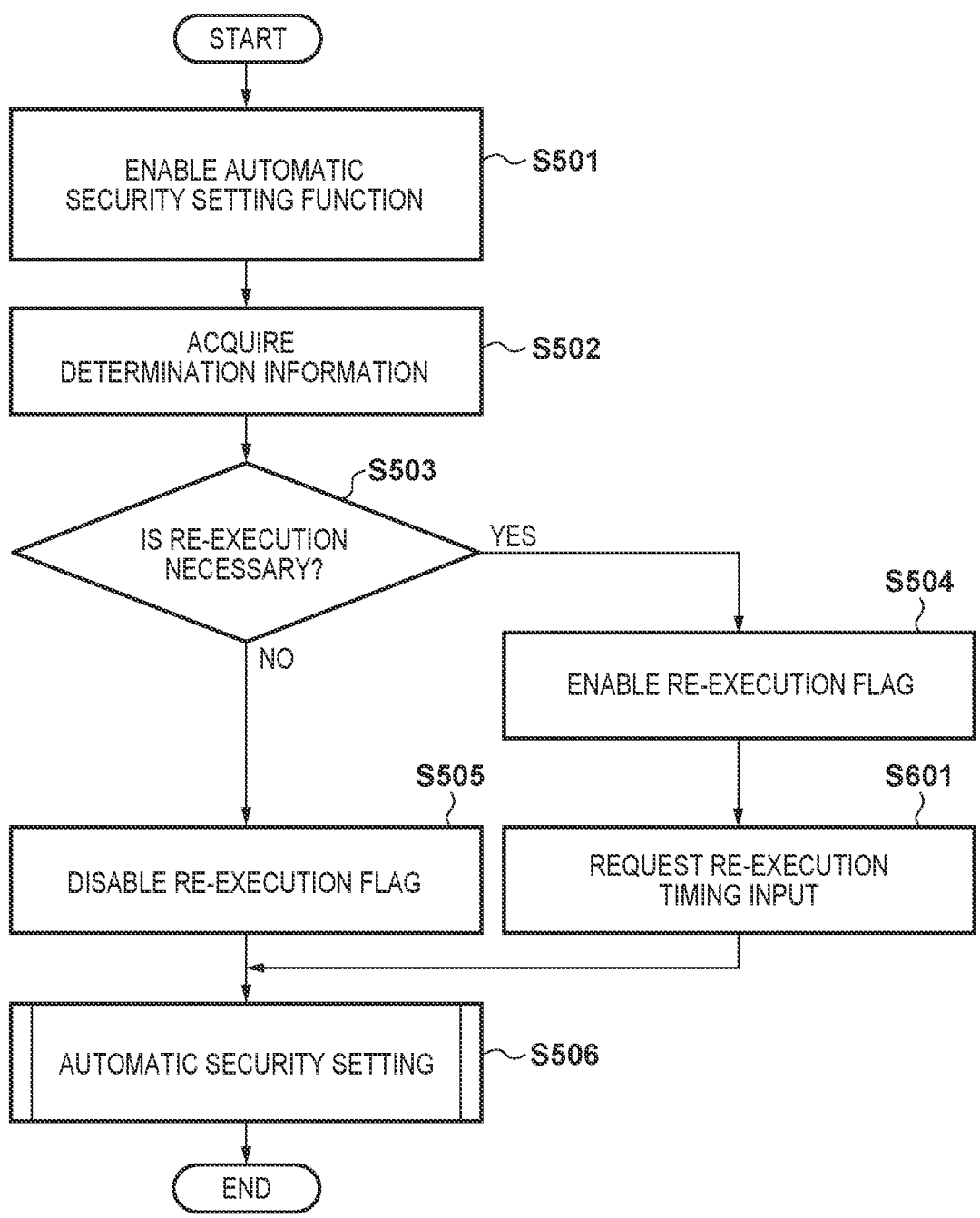
FIG. 6A and FIG. 6B are flowcharts for executing processing according to a first modification of the first embodiment.

Additionally, the processing of S503, S504, and S505 in FIG. 5A in the first embodiment and the processing of S503, S504, S505, and S601 in FIG. 6A in the first modification may be executed after another processing. For example, the processing of S503, S504, and S505 can be executed after the automatic security setting processing in S506 in FIG. 5A.

Furthermore, the determination information used in the execution determination unit 314 can be limited to information for determining the presence or absence of Internet connection. The information for determining the presence or absence of Internet connection is, for example, IP address setting as described in the first embodiment, and the presence or absence of Internet connection can be determined by whether the IP address is a global IP, and thus the installation environment can be determined with relatively high accuracy. Also, the presence or absence of Internet connection is an element that greatly affects the security risk, and thus can be regarded as an important element for installation environment determination. Therefore, in a state where the presence or absence of Internet connection can be determined, the minimum required security setting may be determined to be recommendable at high accuracy, and necessity/unnecessity of re-execution may be determined only with information related to the presence or absence of Internet connection.

Figure 10:
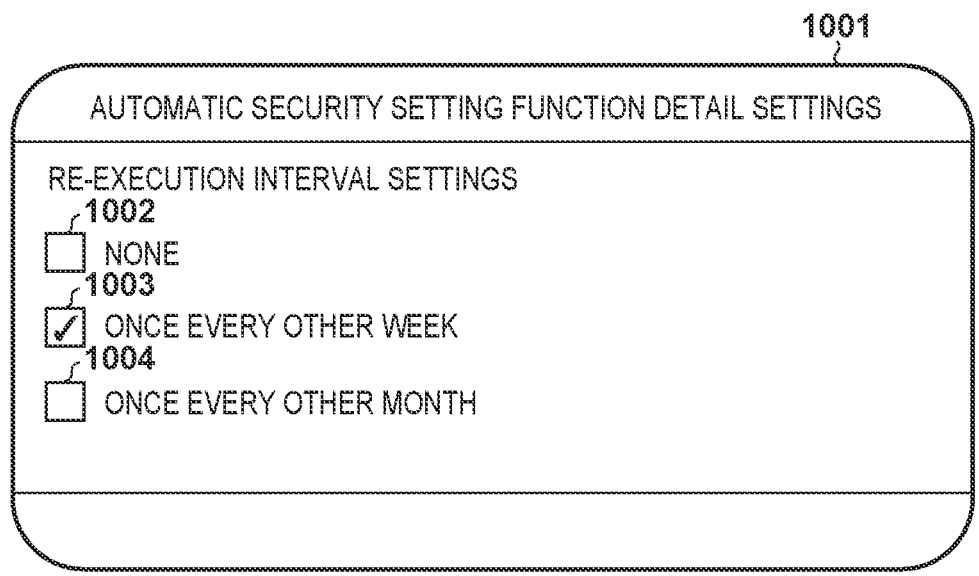
FIG. 10 is a screen configuration diagram of a detail setting (re-execution interval setting) of an automatic security setting function.

In addition, in the first modification, when the execution determination unit 314 determines that the re-execution is necessary, the execution determination unit 314 requests the user for the input of re-execution timing, but the re-execution timing may be set in advance by the user. For example, as illustrated in FIG. 10, the re-execution interval can be set via a detail setting screen 1001 of the automatic security setting function of the operation control unit 301. The detail setting screen 1001 of the automatic security setting function includes a "NO" check box 1002 indicating that the re-execution interval is not preset. Additionally, a check box 1003 indicating re-execution once every other week and a check box 1004 indicating re-execution once every other month are included.

For example, when the user checks the check box 1003, a value indicating the re-execution interval once every other week is stored in the data storage unit 302, and in accordance with this value, the re-execution unit 315 re-executes the automatic security setting processing. At this time, since the re-execution interval has already been set, the processing (re-execution timing input request) in S601 in FIG. 6A is skipped. Similarly, the processing (re-execution timing input request) in S613 in FIG. 6B is also skipped. Note that the detail setting screen 1001 of the automatic security setting function is merely an example, and another method may be used as long as the method can similarly preset the re-execution timing.

Figure 6B:
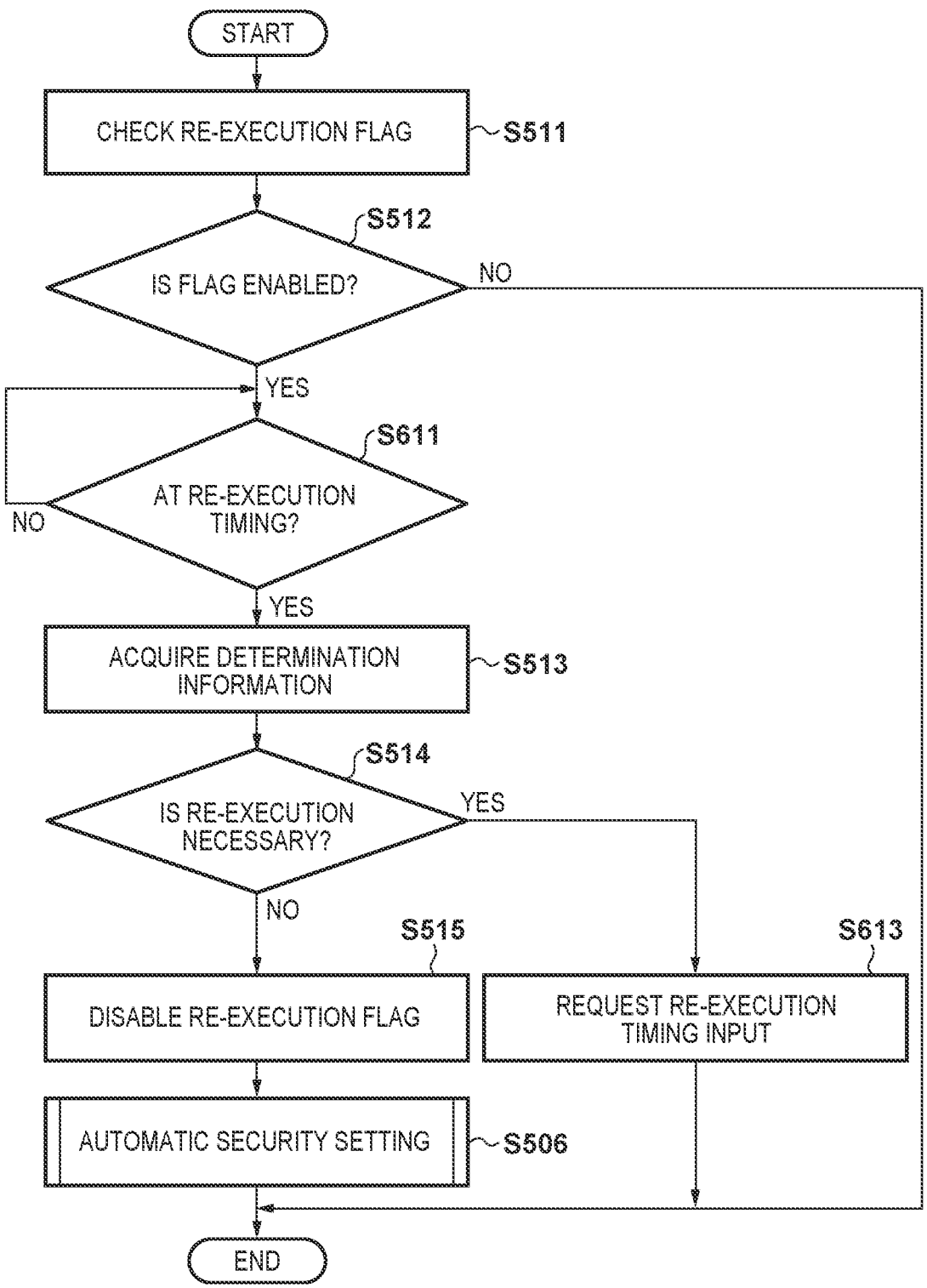

Additionally, in the first modification, after S613 in FIG. 6B, the processing is terminated as is, but the automatic security setting processing in S506 may be executed after the processing of S613.

In addition, a message requesting re-execution may be displayed via, for example, a UI and re-execution may be executed upon permission by the user, rather than automatic re-execution in a background during re-execution of the automatic security setting processing. At this time, for example, prior to the processing of S506 depicted in FIG. 5B and FIG. 6B, processing of displaying a message whether to re-execute the automatic security setting on the UI may be added. Only when the user presses a button to permit the re-execution, the automatic security setting may be re-executed, and when the user rejects it, the processing may be terminated as is.

Furthermore, the recommendation of recommended security setting by the recommendation unit 312 and the batch setting by the batch security setting unit 313 have been described as continuous processing, but the processing may be terminated at the recommendation by the recommendation unit 312. In this case, the user changes the setting with reference to the recommended security setting list that has been recommended. In this case, the components of the automatic security setting unit 316 can be only the installation environment determination unit 311 and the recommendation unit 312.

In addition, in the first modification, processing is not executed in the execution determination unit 314 and automatic security setting may be re-executed automatically according to the re-execution timing. At this time, for example, as described in the modification, the re-execution unit 315 re-executes the automatic security setting according to the re-execution timing preset via the setting screen. In the present modification, since the re-execution flag is not operated by the execution determination unit 314, specifically, the processing of S503, S504, S505, and S601 in FIG. 6A is eliminated, and the processing of S506 is directly executed after S502. Also, the processing of S511, S512, S514, S515, and S613 in FIG. 6B is eliminated, and the processing of S506 is executed directly after S513. For example, in a case where once every other week is set as the re-execution interval, the re-execution unit 315 executes the automatic security setting once every other week.

Additionally, in the above-described modifications, the re-execution interval is the fixed value, but may be gradually extended. For example, in a case where once every other week is set as the re-execution interval, the re-execution interval may be gradually extended so as to be once every other week for the first one month, once every two weeks for the next one month, and once every three weeks for the subsequent one month. The installation environment also depends on, for example, a connection status and communication/operation status of peripherals and therefore it tends to be unstable immediately after installation, but stabilizes over time.

Therefore, frequent re-execution immediately after the installation at which the environment is unstable and gradual extension of re-execution timing as the environment stabilizes ensure efficient re-execution of the automatic security setting processing by installation environment determination.

Additionally, in the above-described embodiments and modifications, processing in FIG. 5A and FIG. 6A has been described as processing when the automatic security setting function is enabled for the first time after installation of the MFP, but this is an example. For example, even when the automatic security setting is enabled for the first time after initialization of the MFP, the processing in FIG. 5A and FIG. 6A may be executed similarly to that at the first time after installation of the MFP.

As described above, in a case where a specific timing (e.g., a timing at which the installation environment determination information has been accumulated to some extent or a timing specified by the user) is reached, the user is requested to execute the installation environment determination processing again or the installation environment determination/setting is automatically executed. In this way, even in a case where the security setting is executed based on erroneous determination immediately after installation of the MFP, the setting can be automatically corrected to the security setting appropriate for the installation environment later, and therefore a risk of the user continuously using the MFP with the improper security setting can be suppressed.

According to the present invention, continuation of improper security setting can be suppressed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-206260, filed Dec. 20, 2021, which is hereby incorporated by reference herein in its entirety.

What is claimed is:

1. An information processing apparatus, comprising
a setting unit that executes a security setting on the information processing apparatus based on an installation environment of the information processing apparatus;
a determination information acquisition unit that acquires determination information, the determination information being information for determining the installation environment of the information processing apparatus; and
an execution determination unit that determines whether the security setting needs to be executed again by the setting unit, based on the determination information, wherein
the setting unit executes the security setting again at a specific timing in a case where it is determined that the security setting needs to be executed again by the setting unit,
wherein the determination information includes an amount of information of log information of the information processing apparatus,
wherein the execution determination unit determines that the security setting needs to be executed again in a case where the amount of information is not accumulated by an amount exceeding a predetermined threshold value, and wherein the specific timing includes a timing when the amount of information is accumulated by the threshold value.

2. The information processing apparatus according to claim 1, wherein
the determination information includes information on presence or absence of a network boundary of the information processing apparatus.

3. The information processing apparatus according to claim 1, wherein
the determination information includes information on presence or absence of an Internet connection of the information processing apparatus.

4. The information processing apparatus according to claim 1, wherein
the determination information includes information on presence or absence of a physical boundary that divides an environment where the information processing apparatus is disposed into inside and outside.

5. The information processing apparatus according to claim 1, wherein
the determination information includes an accumulated operation time of the information processing apparatus.

6. The information processing apparatus according to claim 1, further comprising
a recommendation unit that recommends the security setting appropriate for the installation environment of the information processing apparatus determined based on the determination information, wherein
the setting unit sets the security setting recommended by the recommendation unit to the information processing apparatus.

7. The information processing apparatus according to claim 1, wherein
the execution determination unit is configured such that when the determination information does not satisfy a predetermined condition, the execution determination unit determines that the security setting needs to be executed again.

8. The information processing apparatus according to claim 7, wherein
the setting unit is configured such that when the determination information is determined not to satisfy the predetermined condition, the setting unit executes the security setting again at a timing at which the determination information satisfies the predetermined condition as the specific timing.

9. The information processing apparatus according to claim 7, wherein
the setting unit is configured such that when the determination information is determined not to satisfy the predetermined condition, the setting unit compares a security setting according to a current installation environment of the information processing apparatus determined from the determination information with a default security setting of the information processing apparatus according to a predetermined table to set a security setting of a further high security level.

10. The information processing apparatus according to claim 1, wherein
the specific timing is a date and time preset by a user of the information processing apparatus.

11. The information processing apparatus according to claim 1, wherein
the information processing apparatus is an image forming apparatus.

12. A control method of an information processing apparatus, comprising
setting a security setting on the information processing apparatus based on an installation environment of the information processing apparatus;
a determination information acquisition unit that acquires determination information, the determination information being information for determining the installation environment of the information processing apparatus; and
an execution determination unit that determines whether the security setting needs to be executed again by the setting unit, based on the determination information, wherein
in the setting, the security setting is executed again at a specific timing in a case where it is determined that the security setting needs to be executed again by the setting unit,
wherein the determination information includes an amount of information of log information of the information processing apparatus,
wherein the execution determination unit determines that the security setting needs to be executed again in a case where the amount of information is not accumulated by an amount exceeding a predetermined threshold value, and
wherein the specific timing includes a timing when the amount of information is accumulated by the threshold value.

13. A non-transitory computer-readable storage medium storing a program for causing a computer to execute a control method of an information processing apparatus, the control method comprising
setting a security setting on the information processing apparatus based on an installation environment of the information processing apparatus;
a determination information acquisition unit that acquires determination information, the determination information being information for determining the installation environment of the information processing apparatus; and
an execution determination unit that determines whether the security setting needs to be executed again by the setting unit, based on the determination information, wherein
in the setting, a storage medium stores a program for causing a computer to execute the control method of the information processing apparatus that executes the security setting again at a specific timing in a case where it is determined that the security setting needs to be executed again by the setting unit,
wherein the determination information includes an amount of information of log information of the information processing apparatus,
wherein the execution determination unit determines that the security setting needs to be executed again in a case where the amount of information is not accumulated by an amount exceeding a predetermined threshold value, and
wherein the specific timing includes a timing when the amount of information is accumulated by the threshold value.

* * * * *